73-632 SR
XR 3,218,488
TX 3067R
CROSS REFERENCE SEARCH ROOM

Nov. 16, 1965 S. E. JACKE 3,218,488

TRANSDUCER

Filed Aug. 1, 1961

INVENTOR.
STANLEY E. JACKE
BY
Robert Ames Norton
ATTORNEY

3218488
OR IN 310/8.2

United States Patent Office 3,218,488

Patented Nov. 16, 1965

3,218,488
TRANSDUCER

Stanley E. Jacke, Stamford, Conn, assignor, by mesne assignments, to Branson Instruments, Incorporated, Stamford, Conn., a corporation of Delaware Filed Aug. 1, 1961, Ser. No. 128,451
6 Claims. (Cl. 310—8.2)

This invention relates to center bolted, resonance loaded sonic transducers and particularly to composite transducers producing a resonance indicating signal.

Sonic transducers have been developed in recent years to handle considerable amounts of power for use, for example, in the sonic and particularly ultrasonic cleaning of materials and for other uses in which a considerable amount of sonic power is imparted to structures such as tanks and the like containing various baths. In general, these power transducers utilize acoustically resonating materials such as blocks of aluminum, steel, and other materials to modify the frequency of oscillating elements such as piezoelectric ceramic wafers and the like. As considerable amounts of power are usable with frequency controlling masses, problems arose in producing rugged transducers, for the piezoelectric materials are for the most part of limited strength and unless they are clamped rigidly to the metallic or other resonating masses, breakage of the elements, cementing bonds or both frequently results.

The first approach to solution of this problem was to provide external clamping. The weights were provided with shoulders or collars and a series of bolts connected them on their outside. Theoretically this solution was entirely satisfactory, but practical considerations showed that serious problems arose unless the bolts were all tightened with extreme uniformity. Otherwise, if some bolts were tightened more than others strains were placed on the piezoelectric wafers, multiple resonances occurred, and breakages were frequent. The best modern design replaced the collars or shoulders and external bolts with a single massive central bolt which screwed into or through one of the metal resonating masses and clamped the other at a shoulder encountered by the head of the bolt. Piezoelectric wafers, of course, were provided with a central opening through which the bolt passed. This construction produces uniformly clamped, high power capability transducers of excellent durability, and the most modern power transducers are practically all of the centrally bolted type.

In an ordinary transducer problems immediately arose. Where there is a single piezoelectric wafer or there is an odd number, the wafer or the wafer stack had its ends at different potentials and, in the case of a power transducer, very high potentials, up to 1200 volts or more. The conducting surfaces of the wafers in turn placed the metallic resonating masses at different potentials so that they had to be insulated from each other. This required insulation in one of the blocks and presented so much of a problem that the first transducers with odd numbers of piezoelectric wafers were almost immediately superseded by those having two wafers. Now the outside coatings of each wafer in contact with the metallic weights could be at the same potential, for example, ground. The central electrode between the two wafers could be connected to a different potential representing in the vernacular of the electronic engineer the "hot lead." Insulation problems now vanished as the bolts were bolting together two pieces of metal at the same potential, and hence required no insulation, and it was a very simple matter to keep the central holes in the electrode through which the bolt passed through the wafers large enough so that no problems were encountered. The double wafer or back-to-back wafer type of transducer thus represented the best modern practice.

The application of sonics to containers containing baths presents a problem of matching transducer driving frequency with the resonating frequency of the whole system, not just the transducer itself, for of course the container and the bath and the materials in the bath all alter the natural period of the system. Thus, for example, even if a particular tank was driven at a frequency which matched the resonating frequency of the tank and a bath of predetermined depth, when the bath level changed or if too many pieces of different material were introduced for cleaning, the resonant frequency of the whole system departed from the driving frequency, and the mismatch resulted in a marked loss in power transmission efficiency.

In the co-pending application of Jacke and Uphoff, Serial No. 92908, filed March 2, 1961, there is described and claimed an automatically controlled sonic system in which driving transducers imparted sonic vibrations to a container, such as a tank, and another transducer or transducers put out a signal at the frequency corresponding to the resonance of the tank and its contents. This signal was then used to control the frequency of the driving transducers, thereby maintaining automatically a maximum transfer.

Proposals have been made for transducers in which the transducer was not only driven but gave off a signal at the same frequency at which the transducer and its associated system were vibrating. This signal could be used as an indication of frequency mismatch with poor power transfer or for other purposes, including frequency control. The proposed approach took the ordinary two-wafer transducer and used one wafer for driving and the other for giving a signal. This, however, immediately raised the problem of insulation between the metal resonating weights just as had originally arisen with an ordinary single-wafer transducer and the same insulation difficulties were encountered. With care and a certain amount of luck in a not too harsh environment, the transducer actually performed the function of driving and of sending out a signal at the resonant frequency of the system. It is with the improvement of such a composite transducer that the present invention primarily deals.

All problems are very easily solved in a reliable and very cheap manner by interposing an insulating disk between the wafers, for example a disk of sintered aluminum oxide. This permits maintaining the metallic resonating masses at the same potential and eliminates all insulation problems, making possible for the first time transducers which can operate without central bolt insulation in spite of differences in potentials in the wafers which would have put the frequency controlling masses at different potentials and raised the insulation problems set out above. The problem is solved for any transducer which would otherwise present the difficulty and especially composite transducers which are composed of one or more electrically driven piezoelectric elements and at least one element which is mechanically driven and produces an electrical output signal proportional to the amplitude of the sonic vibrations of the transducer and its load. As has been pointed out before, this problem has proved otherwise insoluble except by the use of insulation between the central clamping bolt and one of the metallic resonating masses.

The invention will be described in greater detail in conjunction with the drawings in which.

Figure 1:
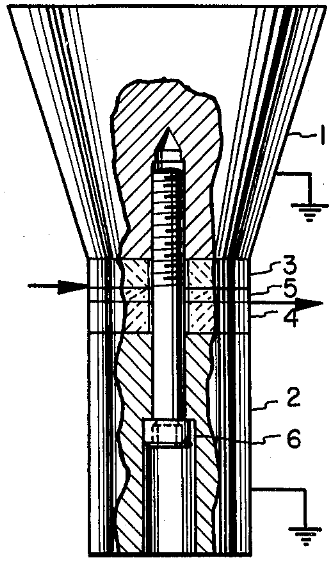
FIG. 1 is an elevation, partly broken away, of a composite transducer having piezoelectric driving and driven elements.

FIG. 1 illustrates a typical modern transducer of the centrally clamped type and includes an aluminum resonating mass 1 having a tapped hole, a steel resonating mass 2 having a shouldered recess, a driving piezoelectric annular disk 3, with potential, shown by an arrow, coming in between the one face of the driving element and the disk 5. A second annular piezoelectric element 4 serves as an electrical signal generator, the hot lead being illustrated by an outgoing arrow and the steel mass 2 being at ground potential. The transducer has the essential element of the present invention, namely the sintered aluminum oxide annular insulating disk 5 between the two surfaces of the piezoelectric elements 3 and 4 which are at different potentials. As the steel and the aluminum are at the same potential, which in the drawing is illustrated as being ground, the clamping bolt 6, which clamps the whole transducer together, is not insulated from either metal.

Figure 2:
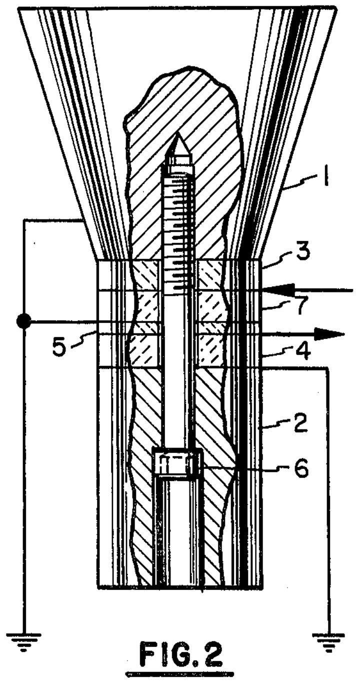
FIG. 2 is a similar elevation of a composite transducer having a plurality of driving piezoelectric elements.

FIG. 2 illustrates a more powerful transducer in which the driving piezoelectric elements are doubled, there being an additional annular element 7. The "hot lead" at a potential different from the aluminum mass comes in the electrode surface which is between the two elements 3 and 7. Again the insulator insulates the hot lead from the signal disk 4 which now is insulated from a ground potential rather than from the other potential as in FIG. 1. The operation is the same as in FIG. 1. The central clamping bolt requires no insulation, and all advantages of the present invention are obtained in a composite transducer with doubled power capability.

Figure 3:
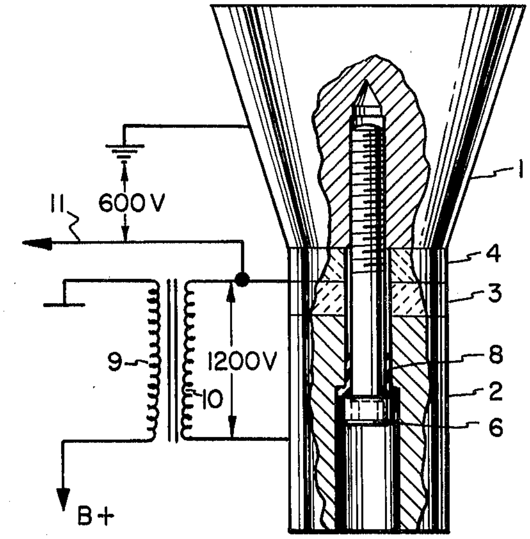
FIG. 3 is a similar elevation of the known form of composite transducer.

The problem which the transducers of the present invention solve can be visualized best by considering a known form of composite transducer, which is shown in FIG. 3. The same elements bear the same reference numerals. The driving piezoelectric element 3 butts against the signal producing piezoelectric element 4. The magnitude of the problem can be visualized by noting the partial schematic which is shown. The driving input is from a transformer having a primary 9 going from the plate of the power tube or tubes and a secondary 10 which is connected to the steel weight 2 and to the electrode between the two piezoelectric elements 3 and 4. In common with high powered driving transducers, this voltage is quite high and is shown on the drawing as 1200 volts, which is a typical value. This voltage is insulated from the bolt 6 by an insulator 8 in the form of a shoulder washer surrounding the clamping bolt 6.

A very severe insulation problem is presented because this washer has to be quite rigid to maintain clamping tension but such insulators are also brittle and tend to break if the clamping pressure is uneven, which is a serious danger with the small dimensions involved. While the transducer of FIG. 3 represents an ingenious attempt to solve a difficult problem, it falls far short of generally satisfactory operation, which is possible with the transducers of the present invention which present no insulation problem at all as far as the clamping bolt is concerned. The insulating disk is extremely cheap and, of course, presents a simple shape problem.

Reference has been made to the use of sintered aluminum oxide as an insulating disk. This is a preferred material because it is cheap, rugged and an excellent insulator. However, it should be understood that the invention itself is in no wise concerned with the nature of the insulating disk, which may be of any material suitable for the conditions of operation of the transducer.

I claim:

1. A composite sonic transducer comprising in combination two piezoelectric systems, each system comprising at least one piezoelectric element in the form of an annular disk having a central hole, resonating and frequency controlling metallic masses on either side of the two systems, the metallic masses being bolted together centrally through the central holes of the disks by a metallic bolt of smaller cross-section than the central holes, and annular insulating disks separating surfaces at different operating potentials, the metallic masses being connected to a single external potential which constitutes a common potential of the two piezoelectric systems and separate connections from the other surfaces of each system to separate external circuits whereby the metallic masses require no insulation to the central clamping bolt.

2. A transducer according to claim 1 in which a piezoelectric disk produces an outgoing electric signal which is a function of the amplitude of the transducer vibrations, and at least one piezoelectric disk supplied with a driving current at the resonance frequency, the insulation being between the two types of disks.

3. A transducer according to claim 2 in which the driving piezoelectric elements are of even number with the driving potential applied between the interface of the disks and the metallic elements.

4. A transducer according to claim 3 in which the metallic masses are of dissimilar metals, one of them being aluminum and being shaped in the form of a sonic transformer.

5. A transducer acording to claim 1 in which the annular insulating disk is of sintered aluminum oxide.

6. A transducer according to claim 2 in which the annular insulating disk is of sintered aluminum oxide.

References Cited by the Examiner

UNITED STATES PATENTS

| | | | |
|---|---|---|---|
| 2,625,035 | 1/1953 | Firestone | 73—67.8 |
| 2,895,061 | 7/1959 | Probus | 310—8.7 |
| 2,947,889 | 8/1960 | Rich | 340—10 |
| 3,066,232 | 11/1962 | Branson | 310—8.7 |
| 3,117,768 | 1/1964 | Carlin | 310—8.7 |

ORIS L. RADER, *Primary Examiner.*

MILTON O. HIRSHFIELD, *Examiner.*